United States Patent Office 3,369,460
Patented Feb. 20, 1968

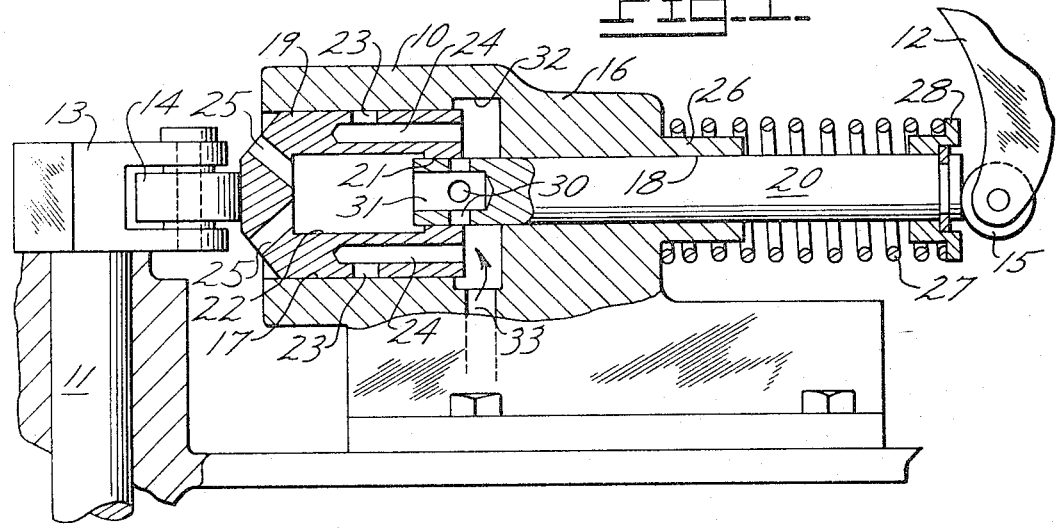
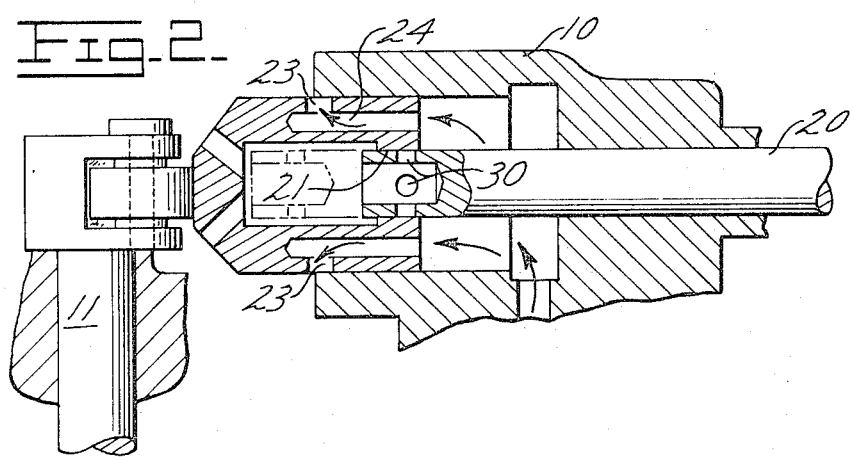
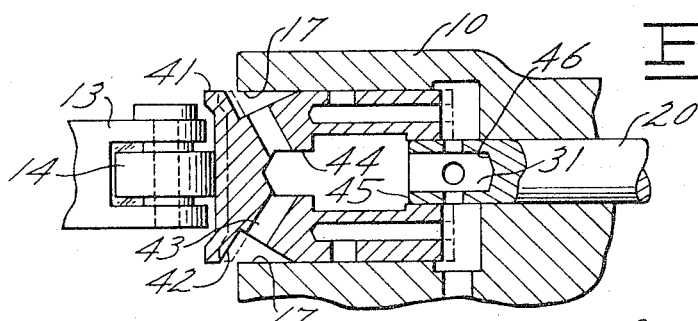
INVENTORS
CHARLES C. EHLKE
DONALD K. STROHSCHEIN
JOHN W. YANCEY
BY
Fryer, Genovold, Fix & Phillips
ATTORNEYS

3,369,460
HYDROMECHANICAL LOST MOTION SERVO VALVE
Charles C. Ehlke and Donald K. Strohschein, Naperville, and John W. Yancey, East Peoria, Ill., assignors to Caterpillar Tractor Co., Peoria, Ill., a corporation of California
Continuation-in-part of application Ser. No. 363,241, Apr. 28, 1964. This application Apr. 15, 1966, Ser. No. 542,837
3 Claims. (Cl. 91—49)

This application is a continuation-in-part of our assignee's U.S. Ser. No. 363,241, now Patent No. 3,262,525, filed Apr. 28, 1964.

The present invention relates generally to servo valves and more particularly to servo valves which accommodate lost motion in an improved and efficiently simple manner.

It is often required that mechanical movements be done in sequence. For example, in the steering of track-type tractors by pedal actuated controls in the manner described in the above-identified co-pending application, it may be required that an engaged clutch become successively disengaged and thereafter that a brake be progressively applied. If one movement, as for example the depression of one pedal, is to cause such a sequential two-step operation to take place in two separate mechanisms, such as in the clutch and in the brakes, it is usually required that lost motion be accommodated.

It is not unknown in the prior art to accommodate lost motion. A common way of accommodating lost motion is by means of mechanical connections. Such mechanical connections may take the form of a mechanical piston-cylinder arrangement wherein the piston may slide axially in a temporarily stationary cylinder until it contacts the head of the cylinder whereupon the piston and cylinder arrangement may then continue the axial movement together.

Modern day earth moving equipment manufacturers tend to rely on hydraulically powered means and they also demand an economy of parts. In view of these higher standards, the lost motion devices taught by the prior art are unsatisfactory. In the present invention, the servo valve piston is not only hydraulically actuated but it serves two functions, one of which is to provide the over-travel requirements of a lost motion device and the other is to act itself as an actuating member.

Accordingly, it is an object of the present invention to provide a hydromechanical servo valve which can accommodate lost motion.

It is a further object of the present invention to provide a servo valve adapted to permit over-travel between its hydraulically actuated piston and a mechanically actuated control plunger.

It is a further object of the present invention to provide a servo valve having a hollow piston which not only accommodates lost motion but also operates as an actuating member.

It is yet another object of the present invention to provide a hydromechanical lost motion servo valve which senses wear in parts operably associated with the valve.

Still further and more specific objects and advantages of the invention and the manner in which the invention is carried into practice are made apparent in the following secification wherein reference is made to the accompanying drawing.

In the drawing:

FIG. 1 is an enlarged sectional view of one embodiment of the hydromechanical servo valve of the present invention;

FIG. 2 is a view like FIG. 1 illustrating the piston of the servo valve in its position of maximum displacement; and FIG. 3 is an enlarged sectional view of an alternate embodiment of the servo valve of the present invention.

Referring to FIGS. 1 and 2, an embodiment of the hydromechanical servo valve 10 of the present invention is shown fixedly supported between a rotatable shaft 11 and a manually operable lever 12. The shaft carries at its upper end a lever 13, one end of which is bifurcated to pivotally mount an anti-friction roller 14 between its bifurcated ends. The lever 12 pivotally supports an anti-friction roller 15 at its lower end.

The servo valve has a housing 16 which is internally, concentrically bored to form cylindrical surfaces 17 and 18 which respectively receive for reciprocal movement therein, an hydraulically operable hollow piston 19 and a mechanically activated control plunger 20. The hollow piston has an internal bore 21 in which the forward end of the plunger may be slidably received. The piston has another internal bore 22 which is concentric with bore 21 but which is of slightly greater diameter. The side walls of the piston have surface ports 23 which communicate with axial passageways 24 also in the side walls. These axial passageways open to the rear of the piston. The forward end of the hollow piston has chamfered edges and diverging passageways 25, which provide access from the internal bore 22 of the piston to the atmosphere.

The rear end of the housing terminates in a shoulder 26 which serves as a seat for one end of a compression spring 27. The other end of the spring engages a seat 28 attached to the rear end of the plunger. The spring urges the plunger rearwardly and against any forward axial thrust which may be imparted to it by lever 12.

The forward, piston-engaging end of the plunger has a pair of transverse and interconnected passageways 30 which communicate with axial bore 31 itself opening to the forward end of the plunger.

Between bores 17 and 18 of the valve housing is a bore 32 which is of relatively small axial extent and which has an internal diameter slightly larger than bore 17.

Oil under pressure from a source, not shown, enters bore 32 from a port 33 shown in FIG. 1. In the position that the forward end of the plunger assumes with respect to bore 21 of the piston in FIG. 1, the oil flows from port 33 to the atmosphere and a reservoir (not shown) via intermediate bore 32, transverse passageways 30, axial bore 31, bore 22 of the hollow piston and diverging passageways 25.

In operation, when it is desired to rotate shaft 11, lever 12 is manipulated clockwise causing it to apply a forward axial thrust at the rear end of the plunger. If the plunger is advanced sufficiently to block transverse passageways 30 in its forward end, the oil will be temporarily trapped in intermediate bore 32 causing an oil pressure to build up behind the rear end walls of the piston. This pressure will cause the piston to advance forwardly and will cause shaft 11 to rock. Further forward movement of the plunger will similarly cause the piston to advance further. Hence, the shaft will rock in proportion with the movement of lever 12. In view of the radial passageways 30 and the axial bore 31 at the end of the plunger, successive forward and backward movements of the plunger so as to open and close fluid communication between port 33 and the interior chamber or bore 22 of the piston will serve to modulate the fluid pressure in bore 32 and will modulate the movement of the piston.

It is significant to note that the oil pressure acts only to advance the piston and that it does not react against the forward end of the plunger so as to push the plunger rearwardly. Accordingly, the force that is required to advance the plunger is only that force which will overcome the counteracting force of spring 27. Also it is significant to note that although the piston is advanced hydraulically and independently of the plunger, the relative position of the advancing piston with respect to bore 17, can be gauged by the relative displacement of the plunger.

Referring to FIG. 2 the piston is shown in its position of maximum displacement. In this position the surface ports 23 have become partially uncovered and they extend beyond the forward end of the valve housing. This allows the oil emanating from port 33 to flow to atmosphere as shown by the arrows via the axial passageways 24 and the surface ports in the piston. In the position shown in FIG. 2 the piston is in a balanced condition. The hydraulic pressure force acting against the rear end of the piston is counterbalanced by the restoring force of the spring-loaded mechanism (not shown) operably associated with shaft 11. It will be recognized that in FIG. 2 the venting of the oil to atmosphere via surface ports 23 will not relieve all the pressure acting against the rear end of the piston. The final pressure acting against the rear end of the piston will depend primarily on the pressure of the oil emanating from port 33 and the amount that the surface ports are uncovered and extend beyond the end of the housing.

Without affecting the piston in its position of FIG. 2, plunger may yet be advanced relative to the interior of the hollow piston to the position shown in phantom lines in FIG. 2. Therefore, if lever 12 is adapted to activate another member in addition to the plunger, this overtravel feature of the valve permits the sequential operation of such other member without affecting the piston in its position of maximum displacement.

It is not expected that in ordinary operations the forward end of the plunger will contact the forward end of the interior of the hollow piston. However, the valve incorporates a notable safety feature in that the machine operator can advance the piston directly by such contact, and without relying on oil pressure, simply by manipulating lever 12 with sudden and normally excessive force. Similarly the machine operator may take advantage of this feature for displacement of the piston by purely mechanical means should the oil pressure fall to an inoperatively low condition.

Referring now to FIG. 3, an alternate form of the piston, which is capable of acting as a sensitive wear sensing device, is illustrated. In this embodiment of the invention, a thin flange 41 is formed on the forward end of the hollow piston and an angular groove 42 is formed immediately behind the flange. Angularly divergent drain ports 43 provide passageways between groove 42 and the reduced end 44 of the forward end of the interior of the hollow piston.

In the position of the piston shown in FIG. 3, the effluent oil is slightly restricted by the walls of inner bore 17. This slight restriction causes a small back pressure to be developed in the interior of the hollow piston. The magnitude of this back pressure is made evident to the machine operator by the magnitude of back pressure which is developed on the combined reaction surfaces of the circumferential portion 45 of the forward end of the plunger and of the back wall 46 at the end of axial bore 31. If a member, such as a spring loaded clutch (not shown), is operably associated with lever 13 such that, when the clutch is worn, it returns the piston to the position shown in phantom lines of FIG. 3, then this embodiment of the invention will serve to warn the machine operator of the clutch wear. In this position of the piston, as shown in phantom lines, the oil restriction and backup pressure caused by the walls of bore 17, flange 41 and groove 42 are much greater. This increase in back pressure causes a significantly large force of reaction to work against the forward end of the plunger. In result, the machine operator will realize a work load substantially above normal in manipulating lever 12. This he may interpret as an indication that the clutch has worn.

We claim:
1. A hydromechanical lost motion servo valve comprising, in combination with a source of fluid pressure and a reservoir therefor: a valve housing having first and second concentric axial bores; a hollow piston disposed for reciprocal movement in the first axial bore, and having third and fourth concentric axial bores, and also having first passage means in the head of the piston between atmosphere and the third axial bore, and also having second passage means in the side walls of the piston between the rear surface of the piston and the surface of the side walls of the piston at a point substantially at its mid portion; a plunger of uniform diameter disposed for reciprocal movement in the second axial bore of the housing and in the third and fourth axial bores of the piston and having surface-opening, continuously interconnected axial and radial fluid passageways in the forward end of the plunger; wherein, upon forward axial movement of the plunger to the extent that the radial fluid passageways in the forward end thereof are blocked by the fourth axial bore of the piston, fluid entering the rear portion of the first bore from a port adjacent the forward portion of the second bore causes the piston to advance under hydraulic pressure.

2. The valve as defined in claim 1 further comprising resilient means operably disposed between the rear end of the plunger and rear end of the valve housing for urging the plunger rearwardly.

3. The valve as defined in claim 1 wherein an annular portion of the side walls of the piston adjacent the head thereof is relieved to provide a reaction surface; and wherein the first passage means opens the third axial bore of the piston to the relieved annular portion.

References Cited
UNITED STATES PATENTS

| | | | |
|---|---|---|---|
| 1,259,883 | 3/1918 | Lewis | 91—402 |
| 2,642,846 | 6/1953 | Morgen | 91—357 |
| 2,902,007 | 9/1959 | Rockwell | 91—401 |
| 3,125,319 | 3/1964 | Arbogast et al. | 91—47 |
| 3,257,912 | 6/1966 | Horst | 91—49 |

MARTIN P. SCHWADRON, *Primary Examiner.*

EDGAR W. GEOHEGAN, *Examiner.*

B. L. ADAMS, *Assistant Examiner.*